United States Patent [19]

Karls

[11] Patent Number: 5,022,875
[45] Date of Patent: Jun. 11, 1991

[54] MARINE PROPELLER LOCKING TAB WASHER

[75] Inventor: Michael A. Karls, Hilbert, Wis.

[73] Assignee: Brunswick Corporation, Skokie, Ill.

[21] Appl. No.: 424,531

[22] Filed: Oct. 20, 1989

[51] Int. Cl.⁵ .............................................. B63H 23/34
[52] U.S. Cl. ..................................... 440/49; 403/320; 411/122; 411/131; 440/83
[58] Field of Search .................. 440/49, 79, 83; 416/2, 416/93 A, 134 R; 403/320; 411/122–124, 131, 136, 143, 148

[56] References Cited

U.S. PATENT DOCUMENTS 3,387,768  6/1968  Zoehfeld .......................... 416/134 X
4,566,855  1/1986  Costabile et al. ............... 416/134 R

FOREIGN PATENT DOCUMENTS 0021997  2/1981  Japan ..................................... 440/49

OTHER PUBLICATIONS

Mercury Marine Service Manual, Brunswick Corporation, 1988, 90-97653-3 1-488, pp. 5C-4 and 5c-5.

*Primary Examiner*—Sherman Basinger
*Attorney, Agent, or Firm*—Andrus, Sceales, Starke & Sawall

[57] ABSTRACT

A marine drive (10) has a propeller (12) with a hub (14) mounted on a propeller shaft (22). A rear thrust hub (30) has one or more slots (40) spaced circumferentially around the propeller shaft. A nut (42) is threaded onto the propeller shaft to mount the propeller. A locking tab washer (60) around the propeller shaft between the nut and the propeller hub has one or more circumferentially spaced tabs (66) bendable forwardly into slots (40) of the rear thrust hub (30) and has ears (68) extending perpendicularly rearwardly from outer tips of the tabs externally of the slots. The ears may be gripped and pulled to bend the tabs rearwardly out of the slots, to enable removal of the nut, and hence removal of the propeller.

5 Claims, 2 Drawing Sheets

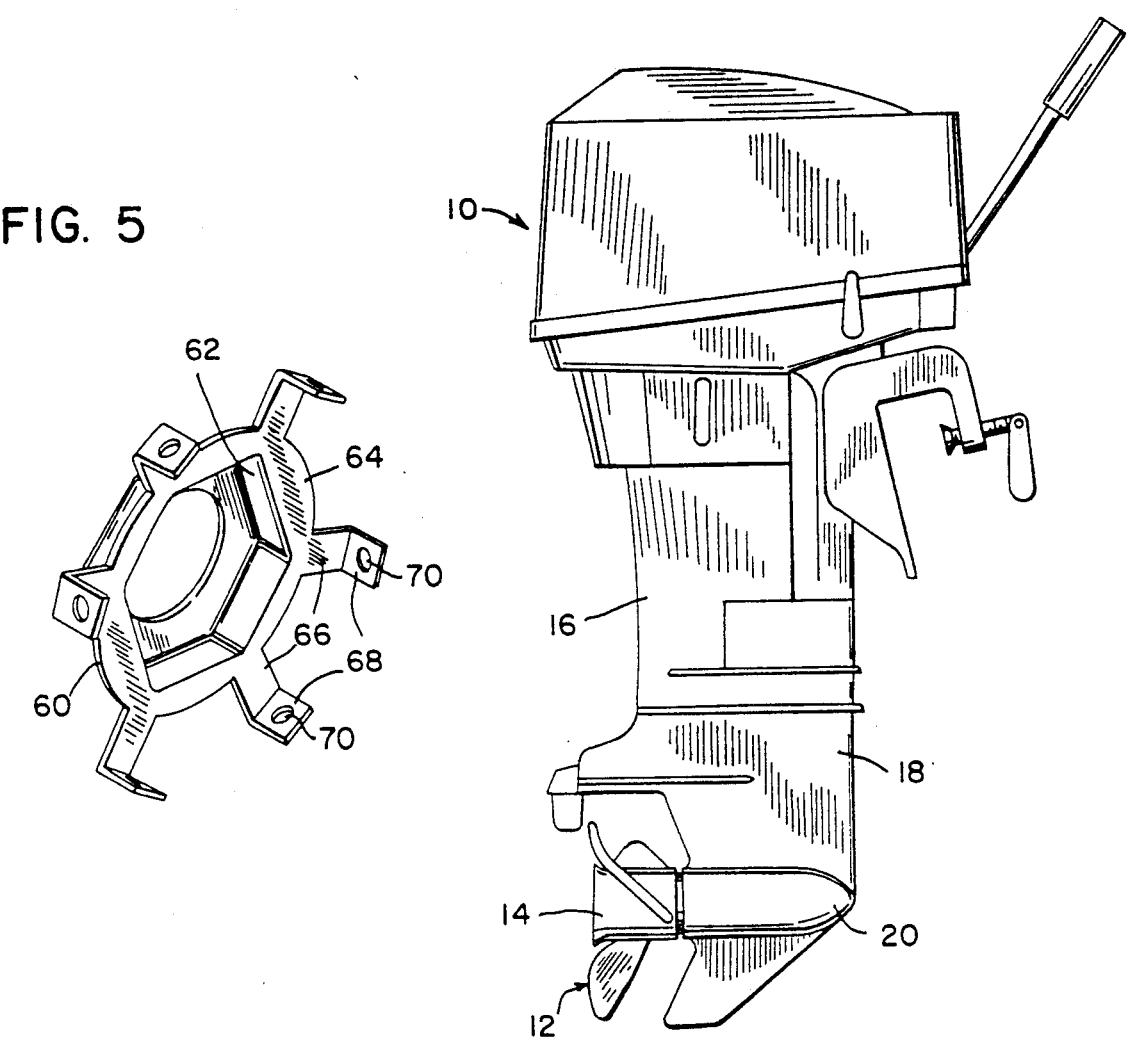
FIG. 5
FIG. 1
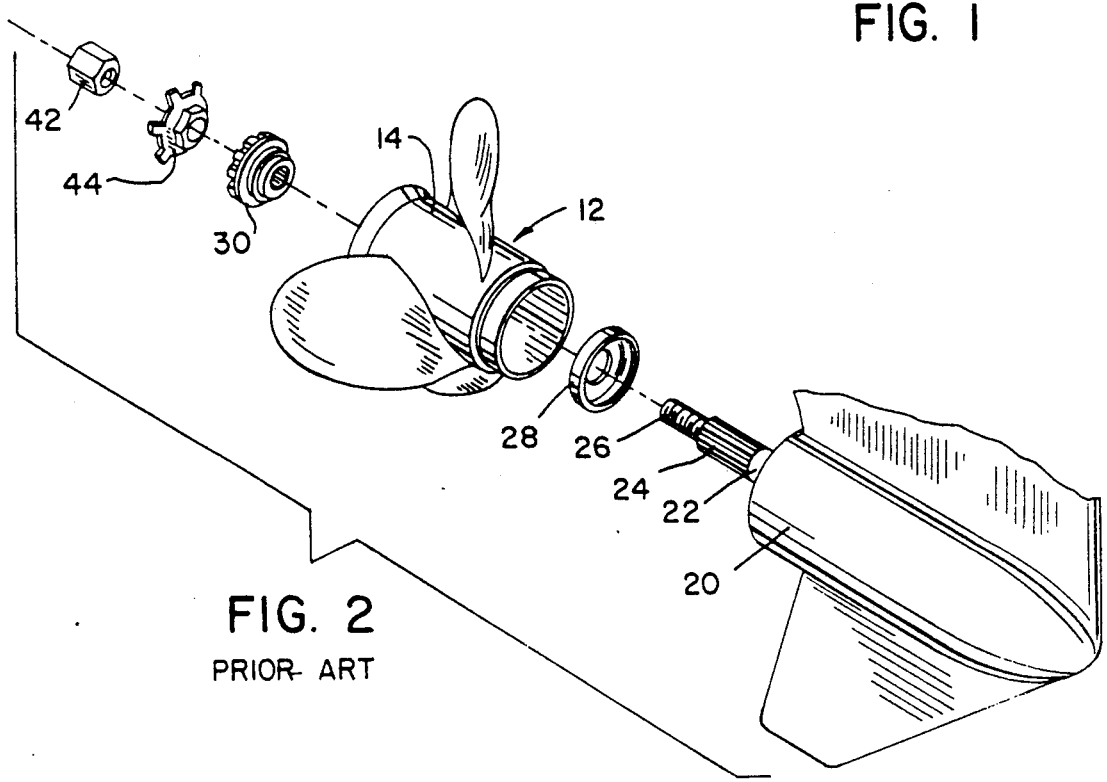
FIG. 2
PRIOR ART

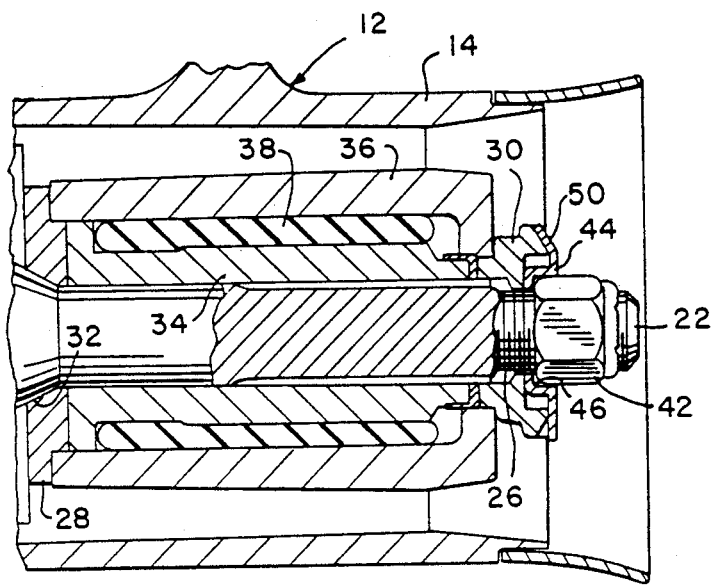
FIG. 3
PRIOR ART
FIG. 4
PRIOR ART
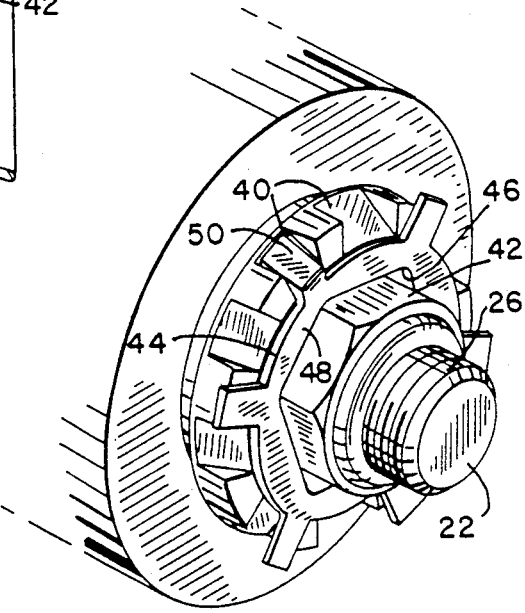
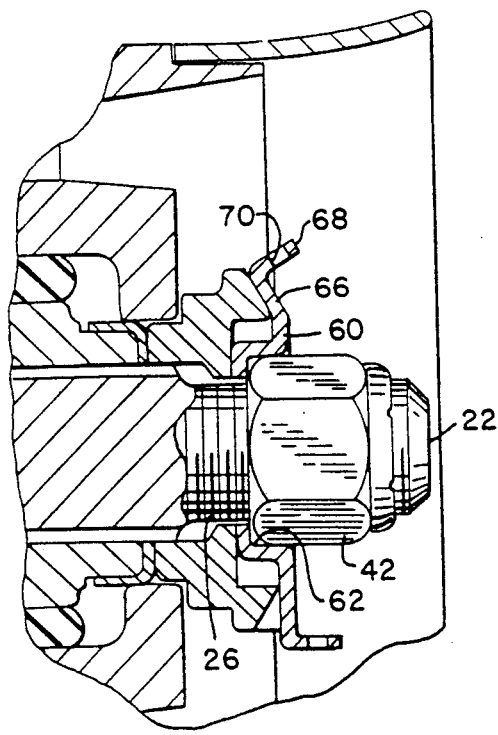
FIG. 6
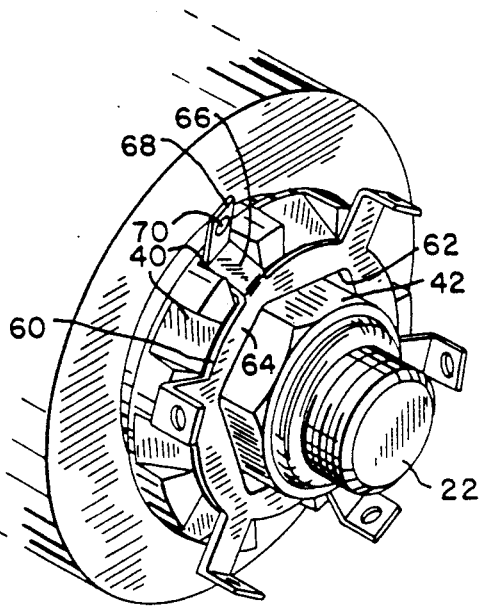
FIG. 7

MARINE PROPELLER LOCKING TAB WASHER

BACKGROUND AND SUMMARY

The invention relates to marine drives, and more particularly to the mounting structure for locking the propeller to the propeller shaft.

It is known in the prior art to lock the propeller nut on the propeller shaft by bending one or more tabs of a locking tab washer into slots of the rear thrust hub. This prevents the propeller nut from rotating, whereby the nut retains the propeller on the propeller shaft.

While the noted locking tab washer has proven useful for its intended purpose, it is quite difficult to unlock, which in turn makes propeller removal difficult. Special tools are required to bend the tabs back out of the slots, in order to remove the nut and the propeller.

The present invention addresses and solves the noted problem in a particularly effective manner and with particularly simple structure, and enables easy removal of the propeller nut without requiring special tools.

BRIEF DESCRIPTION OF THE DRAWINGS

FIG. 1 shows a marine drive.

FIG. 2 shows an exploded perspective view of a portion of FIG. 1, and illustrates a propeller mounting arrangement and locking tab washer known in the prior art.

FIG. 3 is a cross sectional view of a portion of the structure in FIG. 2 in assembled condition.

FIG. 4 is a perspective end view of a portion of the structure in FIG. 3.

FIG. 5 is a perspective view of a locking tab washer constructed in accordance with the present invention.

FIG. 6 is a view like FIG. 3 but using the locking tab washer of FIG. 5.

FIG. 7 is a view like FIG. 4 but using the locking tab washer of FIG. 5.

DETAILED DESCRIPTION

Prior Art

FIG. 1 shows a marine drive 10 having a propeller 12 with a propeller hub 14. The marine drive includes a driveshaft housing 16 with a lower gearcase 18 and torpedo housing 20. Propeller shaft 22, FIG. 2, extends rearwardly from torpedo housing 20 and has a splined portion 24 and a rear threaded portion 26. Propeller hub 14 is splined to splined portion 24 of the propeller shaft between front and rear thrust hubs 28 and 30. Front thrust hub 28 bears against tapered transition portion 32, FIG. 3, of the propeller shaft. Propeller hub 14 has an inner hub portion 34 and an outer hub portion 36, with a rubber torsional shock dampening member 38 therebetween providing limited slip, to prevent propeller breakage upon striking underwater objects.

Rear thrust hub 30 is splined to splined portion 24 of the propeller shaft and engages the rear of propeller hub 14 to mount the propeller hub to the propeller shaft. Rear thrust hub 30 has a plurality of slots 40, FIG. 4, spaced circumferentially around propeller shaft 22. A nut 42 is threaded onto rear threaded portion 26 of the propeller shaft. A locking tab washer 44 is around the propeller shaft between nut 42 and rear thrust hub 50. Locking tab washer 44 has an inner hex configured surface 46 recessed forwardly and receiving hex nut 42 therein and preventing rotation of nut 42 relative to locking tab washer 44. Locking tab washer 44 has a circumferential surface 48 around inner surface 46 and having a plurality of tabs 50 extending radially outwardly therefrom and bendable forwardly into slots 40 to prevent rotation of locking tab washer 44 relative to rear thrust hub 30 which in turn is prevented from rotating relative to propeller shaft 22 by the noted splined mounting thereto at portion 24.

After one or more tabs 50 have been bent into slots 40, it is difficult to grip and bend the tab back out of the slot. The outer tip of the tab is not easily accessible, FIG. 3. Furthermore, a sharp instrument must somehow be wedged into slot 40, forward of the outer tip of tab 50, in order to bend tab 50 rearwardly out of the slot.

Present Invention

FIGS. 5-7 illustrate the present invention, and use like reference numerals from FIGS. 1-4 where appropriate to facilitate understanding. Locking tab washer 60 is around propeller shaft 22 between nut 42 and rear thrust hub 30. Locking tab washer 60 has a given inner configured surface 62, preferably hexagonal to match the hexagonal outer configuration of nut 42. Inner surface 62 is recessed forwardly and receives nut 42 therein and prevents rotation of nut 42 relative to locking tab washer 60. Locking tab washer 60 has a circumferential surface 64 around inner surface 62 and having a plurality of tabs 66 extending radially outwardly therefrom and bendable forwardly into slots 40 of rear thrust hub 30 to prevent rotation of locking tab washer 60 relative to rear thrust hub 30, which in turn is prevented from rotating relative to propeller shaft 22 by the splined mounting thereto at splined portion 24. Tabs 66 have extension ears 68 extending therefrom beyond slots 40 and accessible when tabs 66 are in slots 40 such that ears 68 may be gripped and pulled to bend tabs 66 rearwardly back out of slots 40, to enable removal of nut 42, and hence removal of propeller 12.

As seen in FIGS. 6 and 7, ears 68 extend externally of slots 40 when tabs 66 are in slots 40. In the preferred embodiment, ears 68 have holes 70 therein for gripping by a hook or the like. Tabs 66 may thus be bent back rearwardly by gripping ears 68 with a standard pliers, or by gripping holes 70 with a hook.

Tabs 66 extend radially outwardly from the axis of propeller shaft 22 and perpendicular thereto in pre-bent condition. Ears 68 extend perpendicularly from tabs 66 and parallel to the axis of propeller shaft 22 in the noted pre-bent condition of tabs 66. Ears 68 extend rearwardly from the outer tips of tabs 66 in the noted pre-bent condition of tabs 66.

It is recognized that various equivalents, alternatives and modifications are possible with in the scope of the appended claims.

I claim:

1. In a marine drive having a propeller with a hub, a propeller shaft with a rear threaded portion, a rear thrust hub mounting said propeller hub to said propeller shaft, said rear thrust hub having one or more slots therein spaced circumferentially around said propeller shaft, a nut threaded onto said rear threaded portion of said propeller shaft, a locking tab washer around said propeller shaft between said nut and said rear thrust hub, said locking tab washer having a given configured surface engaging said nut and preventing rotation thereof relative to said locking tab washer, said locking tab washer having one or more tabs spaced circumferentially around said propeller shaft and bendable into said slots to prevent rotation of said locking tab washer relative to said rear thrust hub, said tabs having ears extending therefrom and accessible when said tabs are in said slots such that said ears may be gripped and pulled to bend said tabs back out of said slots, to enable removal of said nut, wherein said ears extend externally of said slots when said tabs are in said slots.

2. In a marine drive having a propeller with a hub, a propeller shaft with a rear threaded portion, a rear thrust hub mounting said propeller hub to said propeller shaft, said rear thrust hub having one or more slots therein spaced circumferentially around said propeller shaft, a nut threaded onto said rear threaded portion of said propeller shaft, a locking tab washer around said propeller shaft between said nut and said rear thrust hub, said locking tab washer having a given configured surface engaging said nut and preventing rotation thereof relative to said locking tab washer, said locking tab washer having one or more tabs spaced circumferentially around said propeller shaft and bendable into said slots to prevent rotation of said locking tab washer relative to said rear thrust hub, said tabs having ears extending therefrom and accessible when said tabs are in said slots such that said ears may be gripped and pulled to bend said tabs back out of said slots, to enable removal of said nut, wherein said ears have holes therein for gripping by a hook or the like.

3. The invention according to claim 1 wherein said tabs extend generally radially outwardly from the axis of said propeller shaft and perpendicular thereto in pre-bent condition, and wherein said ears extend perpendicularly from said tabs and parallel to said axis of said propeller shaft in said pre-bent condition.

4. The invention according to claim 3 wherein said ears extend rearwardly from outer tips of said tabs in said pre-bent condition.

5. In a marine drive having a propeller shaft with a splined portion and a rear threaded portion, a propeller having a propeller hub splined to said splined portion of said propeller shaft, a rear thrust hub splined to said splined portion of said propeller shaft and engaging the rear of said propeller hub to mount said propeller hub to said propeller shaft, said rear thrust hub having one or more slots therein spaced circumferentially around said propeller shaft, a nut threaded onto said rear threaded portion of said propeller shaft, a locking tab washer around said propeller shaft between said nut and said rear thrust hub, said locking tab washer having a given inner configured surface recessed forwardly and receiving said nut therein and preventing rotation of said nut relative to said locking tab washer, said locking tab washer having a circumferential surface around said given inner configured surface with a plurality of tabs extending radially outwardly therefrom and bendable forwardly into said slots to prevent rotation of said locking tab washer relative to said rear thrust hub which in turn is prevented from rotating relative to said propeller shaft by said splined mounting thereto, said tabs having ears extending therefrom beyond said slots when said tabs are in said slots.

* * * * *